US 8,416,243 B2

(12) United States Patent
Plummer (10) Patent No.: US 8,416,243 B2
(45) Date of Patent: Apr. 9, 2013

(54) APPROXIMATING FONT METRICS FOR A MISSING FONT WHEN SUBSTITUTING AN AVAILABLE REPLACEMENT (75) Inventor: Todd Michael Plummer, Estes Park, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/045,405

(22) Filed: Mar. 10, 2011

(65) Prior Publication Data

US 2012/0229517 A1 Sep. 13, 2012

(51) Int. Cl.
*G06T 13/00* (2011.01)
(52) U.S. Cl.
USPC .......................................................... 345/467
(58) Field of Classification Search .................... 345/467
See application file for complete search history.

(56) References Cited

U.S. PATENT DOCUMENTS

| | | | | |
|---|---|---|---|---|
| 4,575,813 A * | 3/1986 | Bartlett et al. ................. | 715/217 |
| 5,586,241 A | 12/1996 | Bauermeister et al. | |
| 5,689,724 A | 11/1997 | Morgan et al. | |
| 5,706,462 A | 1/1998 | Matousek | |
| 5,857,209 A * | 1/1999 | Shively .......................... | 715/206 |
| 5,883,986 A * | 3/1999 | Kopec et al. ................... | 382/310 |
| 6,094,484 A | 7/2000 | Hall, Jr. et al. | |
| 6,175,846 B1 * | 1/2001 | Shively .......................... | 715/206 |
| 6,490,051 B1 | 12/2002 | Nguyen et al. | |
| 6,919,966 B2 | 7/2005 | Nguyen et al. | |
| 7,012,605 B1 * | 3/2006 | Manome ........................ | 345/469 |
| 7,079,264 B2 * | 7/2006 | Nguyen et al. ................. | 358/1.1 |
| 7,222,306 B2 | 5/2007 | Kaasila et al. | |
| 7,385,606 B2 * | 6/2008 | Everett et al. ................. | 345/467 |
| 7,583,267 B2 * | 9/2009 | Stamm et al. ................. | 345/472 |
| 7,633,658 B2 * | 12/2009 | Tsuji ............................. | 358/518 |
| 2003/0178487 A1 * | 9/2003 | Rogers .......................... | 235/454 |
| 2004/0123243 A1 * | 6/2004 | Everett .......................... | 715/517 |
| 2005/0237342 A1 * | 10/2005 | Stamm et al. ................. | 345/613 |
| 2005/0260551 A1 * | 11/2005 | Rubin et al. .................. | 434/317 |
| 2006/0133664 A1 * | 6/2006 | Hong et al. ................... | 382/154 |
| 2006/0139308 A1 * | 6/2006 | Jacobson et al. .............. | 345/107 |
| 2007/0139415 A1 * | 6/2007 | Stamm et al. ................. | 345/472 |
| 2007/0188499 A1 * | 8/2007 | Dowling et al. ............ | 345/472.3 |
| 2007/0216687 A1 * | 9/2007 | Kaasila et al. ................ | 345/441 |
| 2008/0303825 A1 * | 12/2008 | Clegg et al. .................. | 345/471 |
| 2009/0109468 A1 * | 4/2009 | Barclay et al. ............... | 358/1.15 |
| 2009/0109498 A1 * | 4/2009 | Barclay et al. ................ | 358/474 |
| 2009/0113291 A1 * | 4/2009 | Barclay et al. ................ | 715/243 |
| 2010/0014757 A1 * | 1/2010 | Andel et al. .................. | 382/187 |

* cited by examiner

*Primary Examiner* — Javid A Amini

(74) *Attorney, Agent, or Firm* — Osha Liang LLP

(57) ABSTRACT

A method for rendering an electronic document (ED) using a page rendering device, including: identifying, within the ED, a text stream and a requested font for the text stream, where the text stream has a plurality of characters; identifying a resident font supported by the PRD as a substitute for the requested font; generating a plurality of scaled characters by scaling the plurality of characters in the resident font; and rendering, by the PRD, the ED by placing the plurality of scaled characters on a page.

16 Claims, 8 Drawing Sheets

APPROXIMATING FONT METRICS FOR A MISSING FONT WHEN SUBSTITUTING AN AVAILABLE REPLACEMENT

BACKGROUND

Although the demand for printing electronic documents (EDs) is decreasing because of recent improvements in computer displays, there are still those who generate hardcopies of EDs for purposes of reading the EDs. For example, some readers may simply prefer reading a hardcopy over staring at a computer screen. In other instances, hardcopies of the EDs may be provided to a group of people at an informal presentation, or in other situations where reading from a projector screen or computer display is not convenient.

An ED may specify any number of pages having one or more text streams. Further, each text stream may have any number of lowercase and upper characters. Further still, the ED may specify the requested font for displaying/printing the ED. It is the responsibility of a layout engine on a Page Rendering Device (PRD) or user machine to layout the text streams in the document as specified by the ED.

Even though an ED may specify a requested font for a text stream, the layout engine of the PRD might not support the requested font. For example, the requested font may be a rare font or an expensive font. If the PRD attempts to use a substitute font for the text stream when rendering the ED, layout problems are likely to exist. For example, a text stream that was originally intended to fit on a single line may be partitioned across multiple lines in the rendered page/document. Regardless, users still like specifying requested fonts that might not be supported by many PRDs.

SUMMARY OF INVENTION

In general, in one aspect, the invention relates to a method for rendering an electronic document (ED) using a page rendering device (PRD). The method comprises: identifying, within the ED, a text stream and a requested font for the text stream, wherein the text stream comprises a plurality of characters; identifying a resident font supported by the PRD as a substitute for the requested font; generating a plurality of scaled characters by scaling the plurality of characters in the resident font; and rendering, by the PRD, the ED by placing the plurality of scaled characters on a page.

In general, in one aspect, the invention relates to a non-transitory computer readable storage medium storing instructions to render an electronic document (ED) using a page rendering device (PRD). The instructions comprising functionality to: identify, within the ED, a text stream and a requested font for the text stream, wherein the text stream comprises a plurality of characters; identify a resident font supported by the PRD as a substitute for the requested font; generate a plurality of scaled characters by scaling the plurality of characters in the resident font; and render, by the PRD, the ED by placing the plurality of scaled characters on a page.

In general, in one aspect, the invention relates to system for rendering an electronic document (ED) comprising a text stream having a plurality of characters. The system comprising: a hardware processor; a substitute font selector (SFS) configured to identify a resident font as a substitute for a requested font in the ED; a resident font repository storing the plurality of characters in the resident font; and a layout engine executing on the hardware processor and configured to: generate a plurality of scaled characters by scaling the plurality of characters in the resident font; and render the ED by placing the plurality of scaled characters on a page.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering, using a PRD, an ED specifying a requested font for a text stream that is not supported by the PRD. Specifically, a resident font is chosen as a substitute for the requested font. A horizontal scaling (HS) ratio and a vertical scaling (VS) ratio, relating the dimensions of the requested font and the resident font, are retrieved to scale characters of the text stream in the resident font to better match the requested font. Alternatively, multiple scaling matrices, relating the dimensions of the requested font and the resident font, are retrieved to scale characters of the text steam in the resident font to better match the requested font. Separate matrices may exist for the uppercase and lowercase characters. Further, the matrices may include ratios for scaling the characters in the resident font in both the horizontal and vertical directions. The ratios may initially be constructed using the design dimensions of one or more reference characters selected from both the resident font and the requested font.

Figure 1:
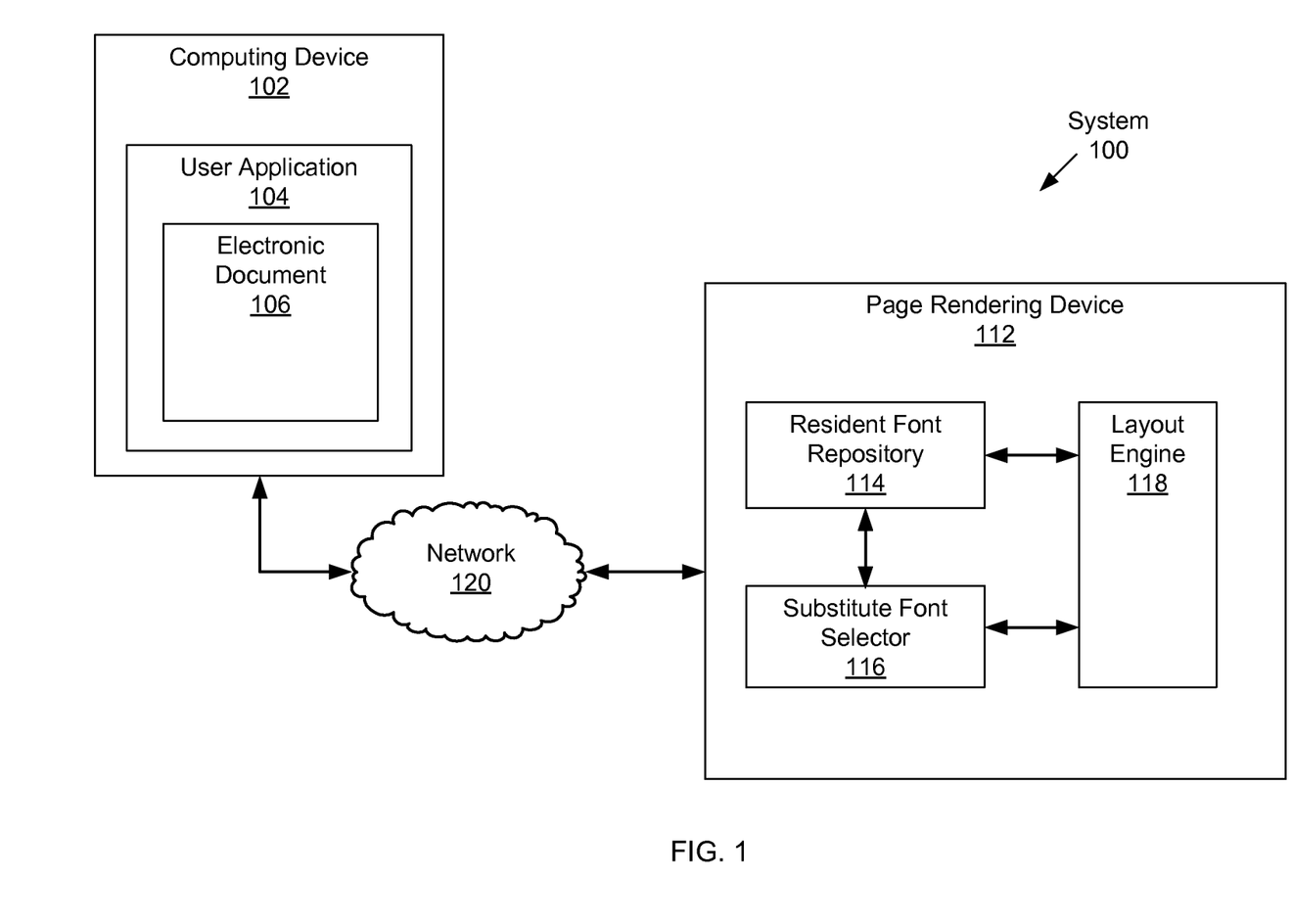
FIG. 1 shows a block diagram depicting a system in accordance in with one or more embodiments of the invention.

FIG. 1 shows a system (100) in accordance with one or more embodiments of the invention. As shown in FIG. 1, the system (100) has multiple components including a page rendering device (PRD) (112) and a computing device (102). The PRD (112) may be a printer, an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the ED (106) includes one or more text streams. A text stream may correspond to a title, a subtitle, a sentence, a paragraph, an entire section of the ED, etc. Accordingly, a text stream may have any number of uppercase and lowercase characters. Further, the ED (106) may also include a requested font and font size for each text stream. In other words, the ED (106) specifies the requested font and font size in which the characters of the text stream should be displayed or printed.

In one or more embodiments of the invention, the ED (106) is represented/defined using a document markup language (e.g., ODF, OOXML, etc.). Accordingly, the properties of the text stream(s) (i.e., characters, requested fonts, font sizes, etc.) in the ED (106) may be recorded as attributes within the tags of the document markup language. Moreover, these properties/attributes are needed to correctly render the ED (106) for display or printing.

In one or more embodiments of the invention, the PRD (112) includes a substitute font selector (116). The substitute font selector (116) is configured to determine that a requested font in the ED (106) is not supported by the PRD (112), and to identify a resident font (i.e., a font supported by the PRD (112)) that may be substituted for the (non-supported) requested font. Those skilled in the art, having the benefit of this detailed description, will appreciate that a resident font that closely resembles the requested font (i.e., the requested font and the resident font are similar in appearance) may be selected as a substitute for the requested font.

In one or more embodiments of the invention, the substitute font selector (116) maintains a list of resident fonts. In such embodiments, any font not found on the list is not supported by the PRD (112). In one or more embodiments of the invention, the substitute font selector (116) includes a file and/or look-up table that can be searched using a requested font as a search criterion. Each entry in the file and/or look-up table corresponds to a requested font. Further, each entry may specify (i.e., map) a resident font as a substitute for the requested font. In one or more embodiments of the invention, an entry specifies one or more scaling matrices relating the dimensions of the requested font and the resident font. In one or more embodiments of the invention, an entry specifies a HS ratio and a VS ratio relating the dimensions of the requested font and the resident font. Updates to the file and/or look-up table may be downloaded from a web site associated with the PRD (112) (e.g., a web site corresponding to a manufacturer of the PRD (112) or a third-party), or manually entered/set by a user of the PRD (112).

In one or more embodiments of the invention, the file or look-up table includes a HS ratio and a VS ratio relating the dimensions of the requested font and the resident font. The HS ratio relates a horizontal dimension (i.e., width) of a reference character in the requested font to the corresponding horizontal dimension of the reference character in the resident font. The VS ratio relates a vertical dimension (i.e., height) of the reference character in the requested font to the corresponding vertical dimension of the reference character in the resident font.

In one or more embodiments of the invention, the file or look-up table includes multiple scaling matrices (i.e., uppercase scaling matrix, lowercase scaling matrix) relating the dimensions of the requested font and the resident font. The uppercase scaling matrix includes an uppercase horizontal scaling (UHS) ratio and an uppercase vertical scaling (UVS) ratio. The UHS ratio relates a horizontal dimension (i.e., width) of an uppercase reference character in the requested font to the corresponding horizontal dimension of the uppercase reference character in the resident font. The UVS ratio relates a vertical dimension (i.e., height) of the uppercase reference character in the requested font to the corresponding vertical dimension of the uppercase reference character in the resident font. Similarly, the lowercase scaling matrix includes a lowercase horizontal scaling (LHS) ratio and a lowercase vertical scaling (LVS) ratio. The LHS ratio relates a horizontal dimension (i.e., width) of a lowercase reference character in the requested font to the corresponding horizontal dimension of the lowercase reference character in the resident font. The LVS ratio relates a vertical dimension (i.e., height) of the lowercase reference character in the requested font to the corresponding vertical dimension of the lowercase reference character in the resident font.

Figure 2A:
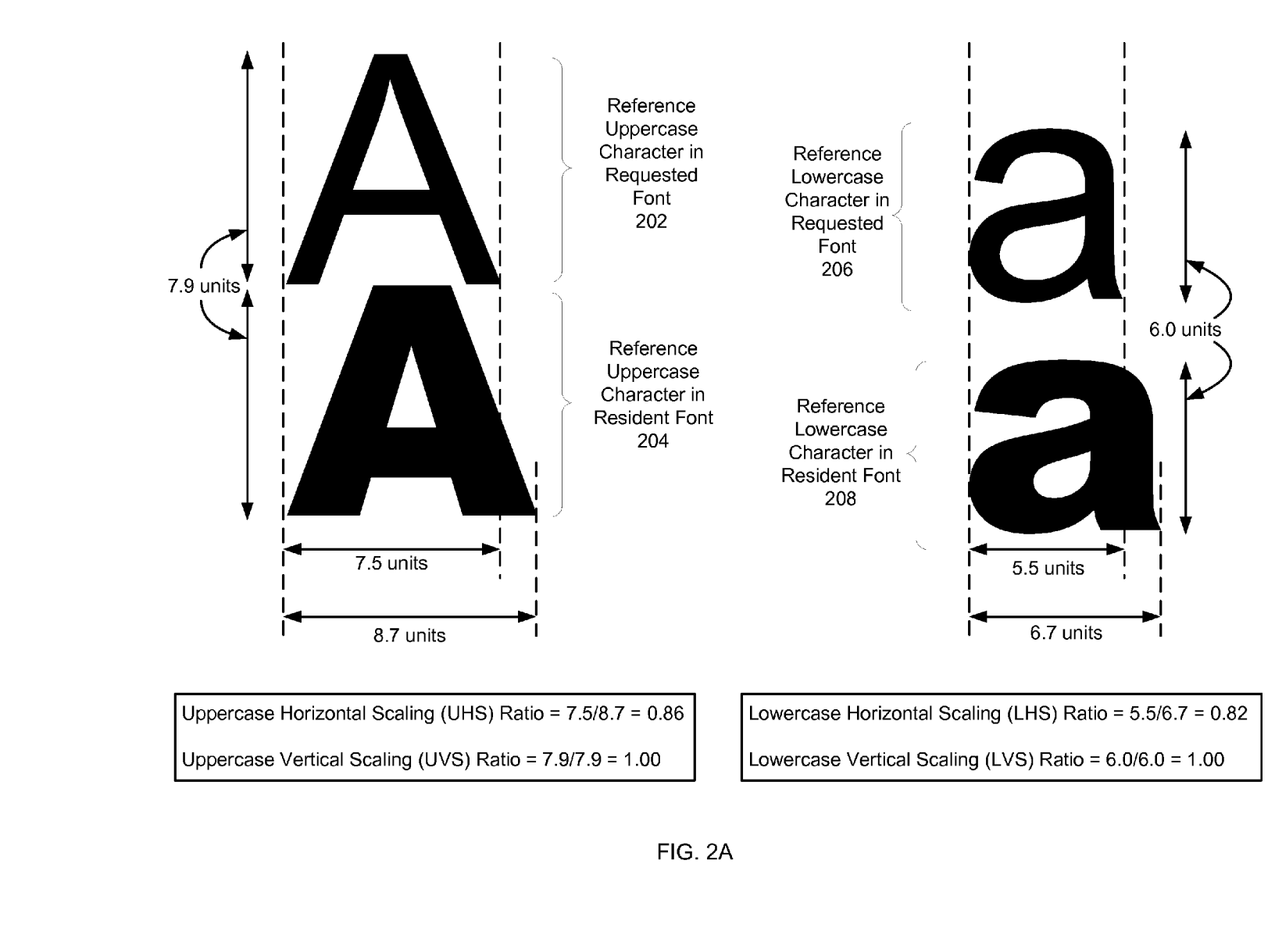
FIG. 2A shows reference uppercase and lowercase characters in both a requested font and a resident font in accordance in one or more embodiments of the invention.

FIG. 2A shows reference uppercase and lowercase characters in both a requested font and a resident font in accordance in one or more embodiments of the invention. As shown in FIG. 2A, the uppercase reference character is "A" and the lowercase reference character is "a". Further, the uppercase character and lowercase character of both the requested font and the resident font are displayed in the same size (i.e., 200 points). Those skilled in the art, having the benefit of this detailed description, will appreciate that any uppercase character may be chosen as the reference uppercase character and any lowercase character may be chosen as the reference lowercase character.

As shown in FIG. 2A, the reference uppercase character in the requested font (202) has a height of 7.9 units and a width of 7.5 units. In contrast, the reference uppercase character in the resident font (204) has a height of 7.9 units and a width of 8.7 units. Accordingly, the UHS ratio may be calculated as UHS ratio=7.5/8.7=0.86. In other words, the design width of the reference uppercase character in the requested font is approximately 86% of the design width of the reference uppercase character in the resident font. The UVS ratio may be calculated as UVS ratio=7.9/7.9=1.00. In other words, the design height of the reference uppercase character in the requested font is 100% (i.e., unity) of the design height of the reference uppercase character in the resident font.

As also shown in FIG. 2A, the reference lowercase character in the requested font (206) has a height of 6.0 units and a width of 5.5 units. In contrast, the reference lowercase character in the resident font (208) has a height of 6.0 units and a width of 6.7 units. Accordingly, the LHS ratio may be calculated as LHS ratio=5.5/6.7=0.82. In other words, the design width of the reference lower character in the requested font is approximately 82% of the design width of the reference lowercase character in the resident font. The LVS ratio may be calculated as LVS ratio=6.0/6.0=1.00. In other words, the design height of the reference lowercase character in the requested font is 100% (i.e., unity) of the design height of the reference lowercase character in the resident font.

Figure 2B:
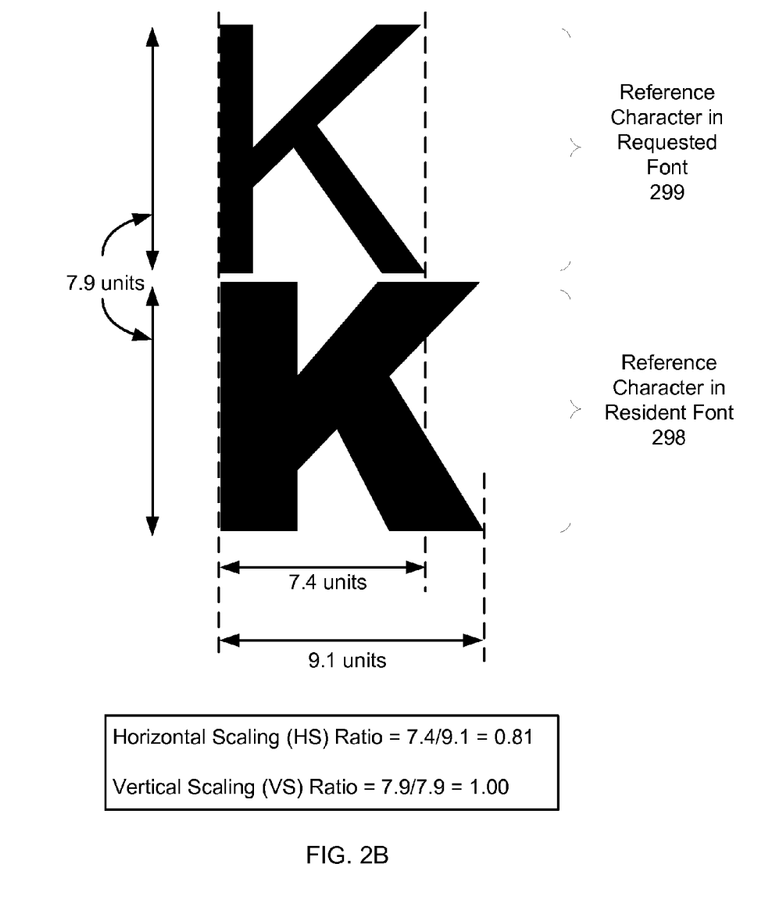
FIG. 2B shows a reference character in both a requested font and a resident font in accordance with one or more embodiments of the invention.

FIG. 2B shows a reference character in both a requested font and a resident font in accordance in one or more embodiments of the invention. As shown in FIG. 2B, the reference character is "K". Further, the reference characters of both the requested font and the resident font are displayed in the same size (i.e., 200 points). Those skilled in the art, having the benefit of this detailed description, will appreciate that any character may be chosen as the reference character.

As shown in FIG. 2B, the reference character in the requested font (299) has a height of 7.9 units and a width of 7.4 units. In contrast, the reference character in the resident font (298) has a height of 7.9 units and a width of 9.1 units. Accordingly, the HS ratio may be calculated as HS ratio=7.4/9.1=0.81. In other words, the design width of the reference character in the requested font is approximately 81% of the design width of the reference character in the resident font. The VS ratio may be calculated as VS ratio=7.9/7.9=1.00. In other words, the design height of the reference character in the requested font is 100% (i.e., unity) of the design height of the reference character in the resident font.

Although in the specific examples shown in FIGS. 2A and 2B a single alphabetic character is employed to determine each of the HS, UHS, LHS, VS, LVS, and UVS ratios, it should be noted that such ratios can be determined by different methods. For instance, the UHS ratio can be determined by dividing a total width of a text string or a text phrase typed using the requested font by a total width of such text string or the phrase typed using the resident font. One specific example according to this substituted method is using a text string including of all of the twenty-six alphabetic characters (i.e., A to Z). This method may be used for any font including fonts that do not employ a fixed width for each character.

Figure 3:
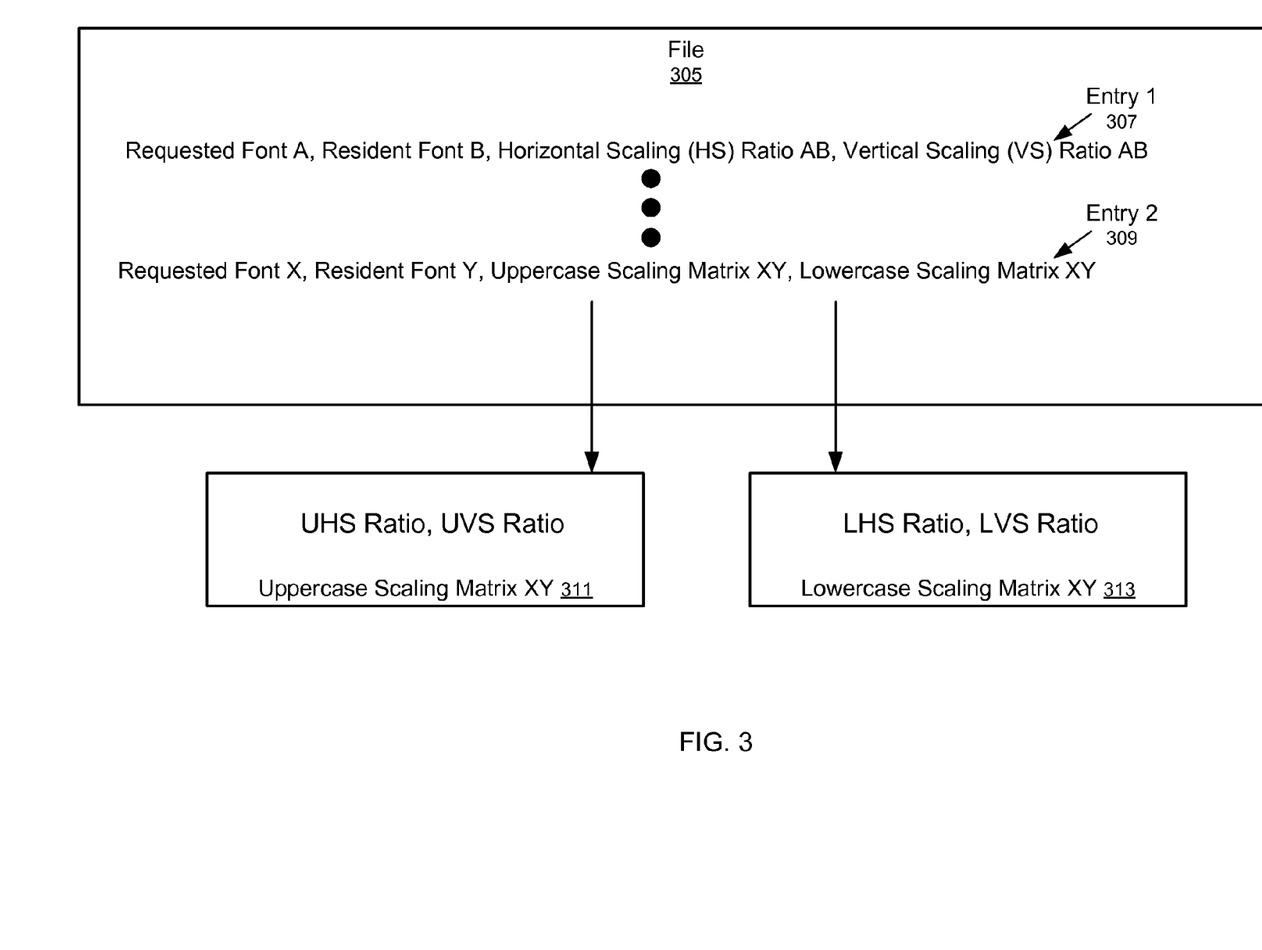
FIG. 3 shows a file in accordance with one or more embodiments of the invention.

FIG. 3 shows a file (305) in accordance with one or more embodiments of the invention. The file (305) may be searched by the substitute font selector (116), discussed above in reference to FIG. 1, using a requested font as a search criterion. As shown in FIG. 3, the file (305) includes multiple entries (e.g., Entry 1 (307), Entry 2 (309)). Each entry identifies a requested font (e.g., Requested Font A, Requested Font X) and a resident font (e.g., Resident Font B, Resident Font Y) as a substitute for the requested font. Further, an entry may specify a HS ratio and a VS ratio relating the dimensions of the requested font and the resident font. For example, Entry 1 (307) specifies the HS Ratio AB and the VS Ratio AB relating the dimensions of requested font A and resident font B. Alternatively, an entry may specify multiple scaling matrices relating the dimensions of the requested font and the resident font. For example, Entry 2 (309) specifies the uppercase scaling matrix XY and the lowercase scaling matrix XY relating the dimensions of the requested font X and the resident font Y. As shown in FIG. 3, the uppercase scaling matrix XY (311) includes the UHS ratio and the UVS ratio relating the dimensions of the requested font X and the resident font Y. In contrast, the lowercase scaling matrix XY (313) includes the LHS ratio and the LVS ratio relating the dimensions of the requested font X and the resident font Y.

Referring back to FIG. 1, in one or more embodiments of the invention, the PRD (112) includes a resident font repository (114). The resident font repository (114) stores the designs and dimensions of all characters for all resident fonts (i.e., fonts supported by the PRD (112)). In other words, the resident font repository (114) stores all the necessary information needed to render (e.g., display, print) any character of a resident font.

In one or more embodiments of the invention, the PRD (112) includes a layout engine (118). The layout engine (118) is configured to identify lowercase and uppercase characters in a text stream of the ED (106), scale the lowercase and uppercase characters in the resident font according to the retrieved scaling matrices (i.e., lowercase scaling matrix, uppercase scaling matrix), and calculate the positions/placement of the scaled characters on a page (e.g., paper, transparencies, microfilm, region on a computer monitor displaying a page image, e-book reader, etc.). Alternatively, the layout engine (118) is configured to scale both the lowercase characters and the uppercase characters in a text stream according to the retrieved HS ratio and the VS ratio, and calculate the positions/placement of the scaled characters on the page. Accordingly, the layout engine (118) is configured to render the ED (106) for viewing and/or printing. Further, the layout engine (118) may access the resident font repository (114) and/or the substitute font selector (116) to perform one or more of its functions.

Figure 4A:
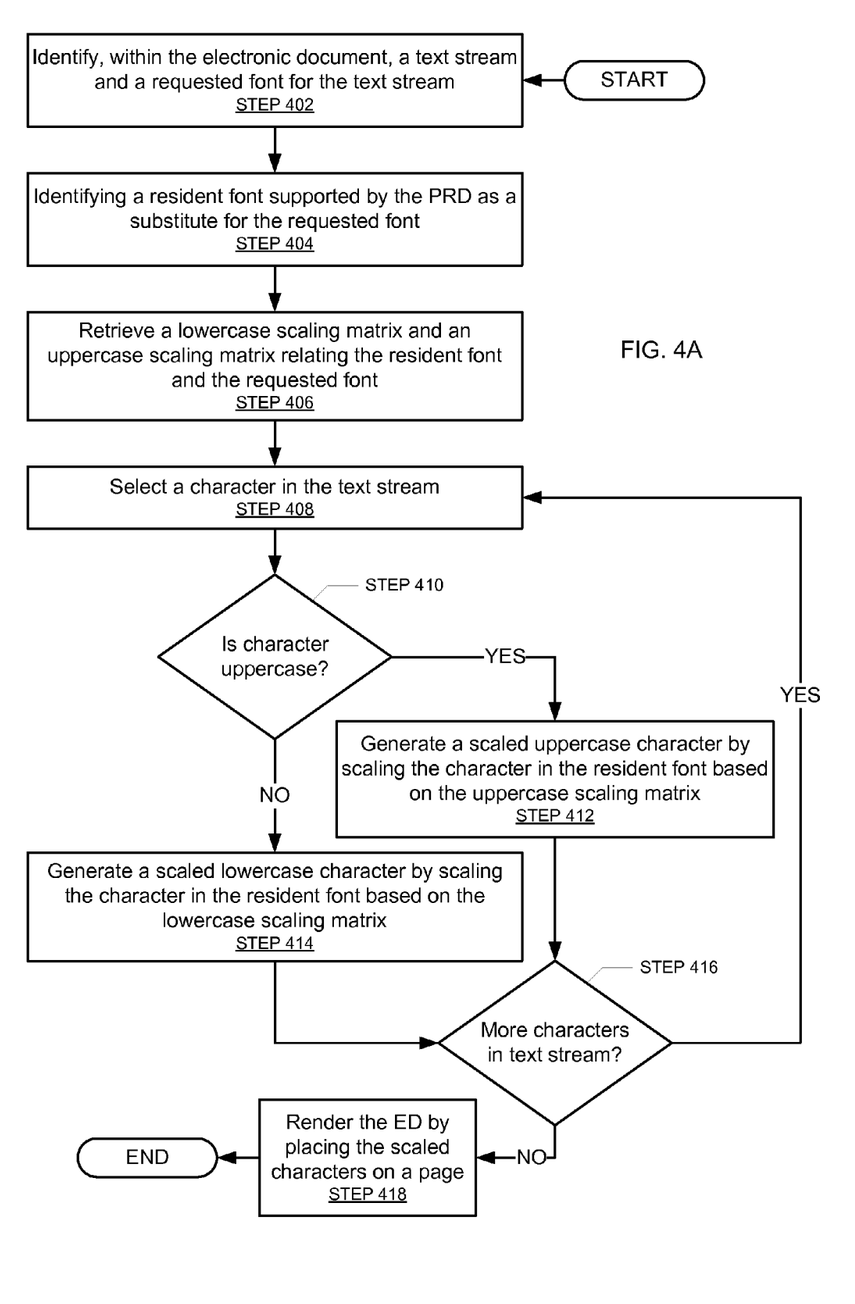
FIG. 4A and FIG. 4B show flowcharts in accordance with one or more embodiments of the invention.

FIG. 4A shows a flowchart in accordance with one or more embodiments of the invention. The process depicted in FIG. 4A may be implemented using the system (100), described above in reference to FIG. 1. One or more steps shown in FIG. 4A may be omitted, repeated, and/or performed in a different order among different embodiments of the invention. Accordingly, embodiments of the invention should not be considered limited to the specific number and arrangement of steps shown in FIG. 4A.

Initially, an ED is obtained and a text stream and a requested font for the text stream are identified within the ED (STEP 402). As discussed above, the text stream may have any number of uppercase and lowercase characters. In one or more embodiments of the invention, the ED is represented/defined using a document markup language (e.g., ODF, OOXML, etc.). Accordingly, the properties of the text stream (i.e., characters, requested fonts, font sizes, etc.) in the ED may be recorded as attributes within the tags of the document markup language. The ED may be obtained by a page rendering device along with a request to render the ED.

In STEP 404, it is determined that the requested font is not supported by the page rendering device and a resident font is identified as a substitute for the requested font. In one or more embodiments of the invention, the requested font may be compared against a list of fonts supported by the page rendering device. If the list does not include the requested font, the page rendering device does not support the rejected font. In one or more embodiments of the invention, the requested font may be used as a search criterion to search a file or look-up table specifying the resident font as a substitute for the requested font.

In STEP 406, a lowercase scaling matrix and an uppercase scaling matrix relating the dimensions of the requested font and the resident font are retrieved (e.g., from a file or look-up table). As discussed above, the uppercase scaling matrix includes a UHS ratio and a UVS ratio. The UHS ratio relates a horizontal dimension (i.e., width) of an uppercase reference character in the requested font to the corresponding horizontal dimension of the uppercase reference character in the resident font. The UVS ratio relates a vertical dimension (i.e., height) of the uppercase reference character in the requested font to the corresponding vertical dimension of the uppercase reference character in the resident font. As also discussed above, the lowercase scaling matrix includes a LHS ratio and a LVS ratio. The LHS ratio relates a horizontal dimension (i.e., width) of a lowercase reference character in the requested font to the corresponding horizontal dimension of the lowercase reference character in the resident font. The LVS ratio relates a vertical dimension (i.e., height) of the lowercase reference character in the requested font to the corresponding vertical dimension of the lowercase reference character in the resident font.

In STEP 408, a character in the text stream is selected. In STEP 410, it is determined whether the character is an uppercase character. When it is determined that the character is an uppercase character, the process proceeds to STEP 412. Otherwise, when it is determined that the character is a lowercase character, the process proceeds to STEP 414.

In STEP 412, a scaled uppercase character is generated. Specifically, the uppercase character in the resident font, having the same font size identified in the ED, is scaled based on the uppercase scaling matrix. In other words, the uppercase character is horizontally scaled (i.e., multiplied) by the UHS ratio and vertically scaled (i.e., multiplied) by the UVS ratio.

In STEP 414, a scaled lowercase character is generated. Specifically, the lowercase character in the resident font, having the same font size identified in the ED, is scaled based on the lowercase scaling matrix. In other words, the lowercase character is horizontally scaled (i.e., multiplied) by the LHS ratio and vertically scaled (i.e., multiplied) by the LVS ratio.

In STEP 416, it is determined whether more characters exist in the text stream that need to be scaled. When it is determined that more characters exist in the text stream, the process returns to STEP 408. Otherwise, the process proceeds to STEP 418.

In STEP 418, the ED is rendered by placing the scaled characters on a page. Specifically, rendering the ED includes calculating the positions/placement of the scaled characters on the page (e.g., paper, transparencies, microfilm, region on a computer monitor displaying a page image, e-book reader, etc.) and then printing/displaying the page.

Although the steps of FIG. 4A only mention the existence of one text stream, the ED may have any number of text streams spread across any number of pages. Accordingly, one or more of the steps in FIG. 4A may be repeated to handle the multiple text streams of the ED.

Figure 4B:
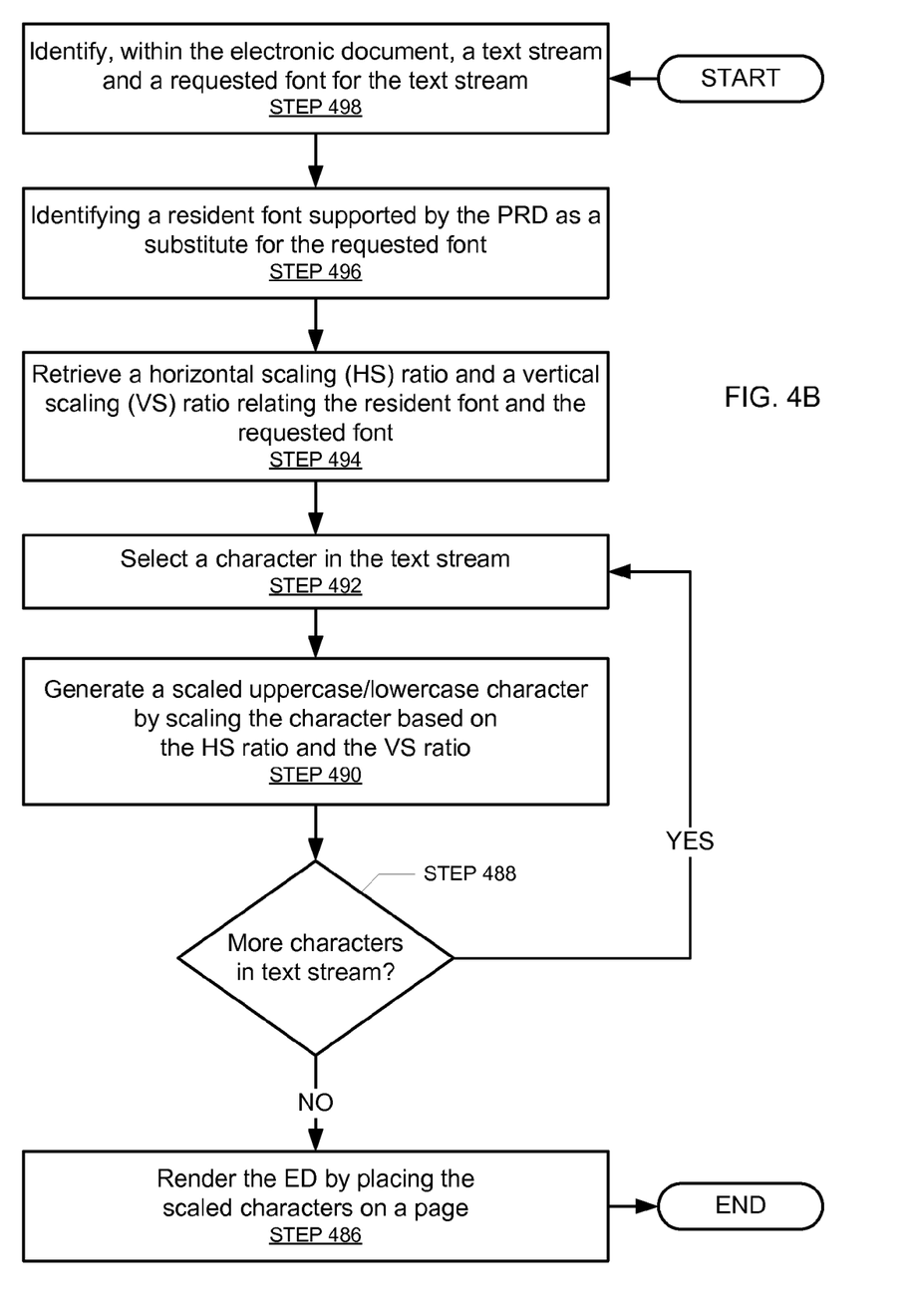

FIG. 4B shows a flowchart in accordance with one or more embodiments of the invention. The process depicted in FIG. 4B may be implemented using the system (100), described above in reference to FIG. 1. One or more steps shown in FIG. 4B may be omitted, repeated, and/or performed in a different order among different embodiments of the invention. Accordingly, embodiments of the invention should not be considered limited to the specific number and arrangement of steps shown in FIG. 4B.

Initially, an ED is obtained and a text stream and a requested font for the text stream are identified within the ED (STEP 498). In STEP 496, it is determined that the requested font is not supported by the page rendering device and a resident font is identified as a substitute for the requested font. STEP 498 and STEP 496 may be essentially the same as STEP 402 and STEP 404, respectively, discussed above in reference to FIG. 4A.

In STEP 494, a HS ratio and a VS ratio relating the dimensions of the requested font and the resident font are retrieved (e.g., from a file or look-up table). The HS ratio relates a horizontal dimension (i.e., width) of a reference character in the requested font to the corresponding horizontal dimension of the reference character in the resident font. The VS ratio relates a vertical dimension (i.e., height) of the reference character in the requested font to the corresponding vertical dimension of the reference character in the resident font.

In STEP 492, a character in the text stream is selected. In STEP 490, a scaled character (uppercase or lowercase) is generated. Specifically, the character in the resident font, having the same font size identified in the ED, is scaled based on the HS and the VS. In other words, the character is horizontally scaled (i.e., multiplied) by the HS ratio and vertically scaled (i.e., multiplied) by the VS ratio.

In STEP 488, it is determined whether more characters exist in the text stream that need to be scaled. When it is determined that more characters exist in the text stream, the process returns to STEP 492. Otherwise, the process proceeds to STEP 486.

In STEP 486, the ED is rendered by placing the scaled characters on a page. Specifically, rendering the ED includes calculating the positions/placement of the scaled characters on the page (e.g., paper, transparencies, microfilm, region on a computer monitor displaying a page image, e-book reader, etc.) and then printing/displaying the page.

Although the steps of FIG. 4B only mention the existence of one text stream, the ED may have any number of text streams spread across any number of pages. Accordingly, one or more of the steps in FIG. 4B may be repeated to handle the multiple text streams of the ED.

Figure 5:
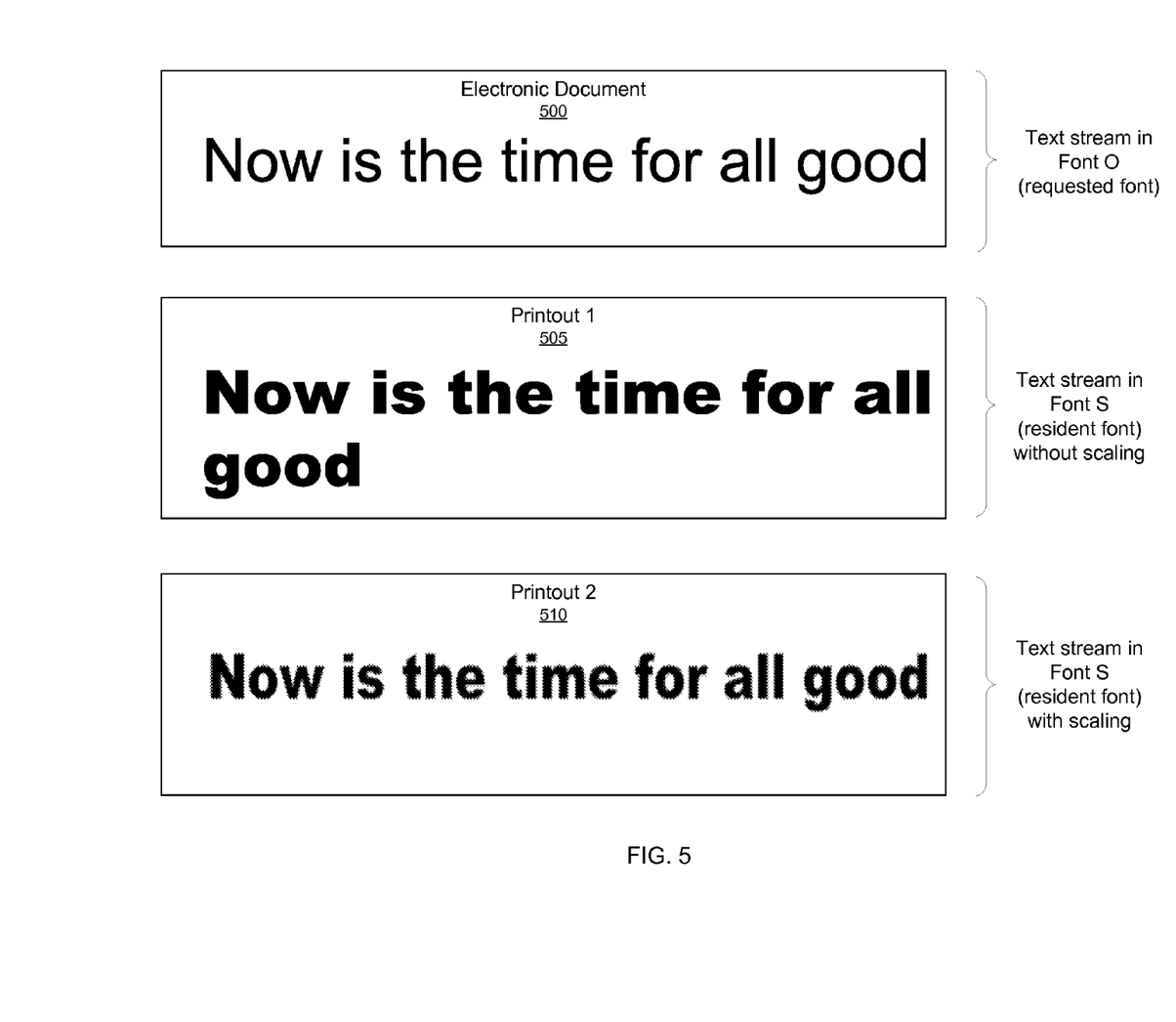
FIG. 5 shows an example in accordance with one or more embodiments of the invention.

FIG. 5 shows an example in accordance with one or more embodiments of the invention. The example of FIG. 5 is related to the process shown in FIG. 4A. In the example, a user has created an ED (500) with the text stream: "Now is the time for all good." The user has set the font of the text stream to Font O. Accordingly, the ED (500) records "Font O" as the requested font for the text stream. Further, as shown in FIG. 5, when the text stream is displayed in Font O (i.e., the requested font), the entire text stream fits on one line.

Now assume the user sends the ED (500) to a printer for printing. However, the printer does not support Font O. Instead, the printer uses Font S (i.e., a resident font) as a substitute for Font O. If no scaling is applied to Font S, Printout 1 (505) is generated by the printer. As shown in FIG. 5, Printout 1 (505) includes the text stream in the Font S (i.e., the resident font). However, as also shown in FIG. 5, the text stream in Printout 1 (505) is distributed across two lines instead of one. The last word of the text stream (i.e., "good"), which should appear at the end of the line, is incorrectly positioned on the next line below. This is a layout issue that results from substituting Font S for Font O. Specifically, this is a layout issue that results from substituting Font S for Font O without performing any scaling on Font S.

Now assume the printer applies one or more scaling matrices to the characters in Font S. In other words, the printer retrieves an uppercase scaling matrix and a lowercase scaling matrix relating the dimensions of Font O and Font S. Specifically, the uppercase scaling matrix has a UHS ratio and a UVS ratio, while the lowercase scaling matrix has a LHS ratio and a LVS ratio. The printer may apply the UHS ratio and the UVS ratio to the "N" character of the text stream in the resident font (i.e., Font S). Similarly, the printer may apply to LHS ratio and the LVS ratio to the remaining lowercase characters of the text stream in the resident font (i.e., Font S). Following the scaling, Printout 2 (510) is generated by placing/positioning the scaled characters on the paper. As shown in FIG. 5, Printout 2 (510) includes the text stream in the resident font. However, unlike Printout 1 (505), the text stream in Printout 2 (510) occupies only a single line, and thus does not suffer from the same layout issue as Printout 1 (505). Accordingly, Printout 2 (510) is a better match than Printout 1 (505) to the ED (500).

Embodiments of the invention have one or more of the following advantages: the ability to reduce/minimize layout issues resulting from font substitution; the ability to scale substitute fonts by specifying uppercase scaling matrices and lowercase scaling matrices; the ability to scale substitute fonts using different scaling matrices for uppercase and lowercase characters; the ability to create an ED specifying a font (i.e., requested font) that is not supported by page rendering devices (e.g., printers); the ability to generate requested font/resident font pairs for a non-supported requested fonts; the ability to scale characters in the resident font by different amounts in the vertical and horizontal directions to better match the requested font; the ability to closely match a requested font without purchasing the requested font; etc.

Figure 6:
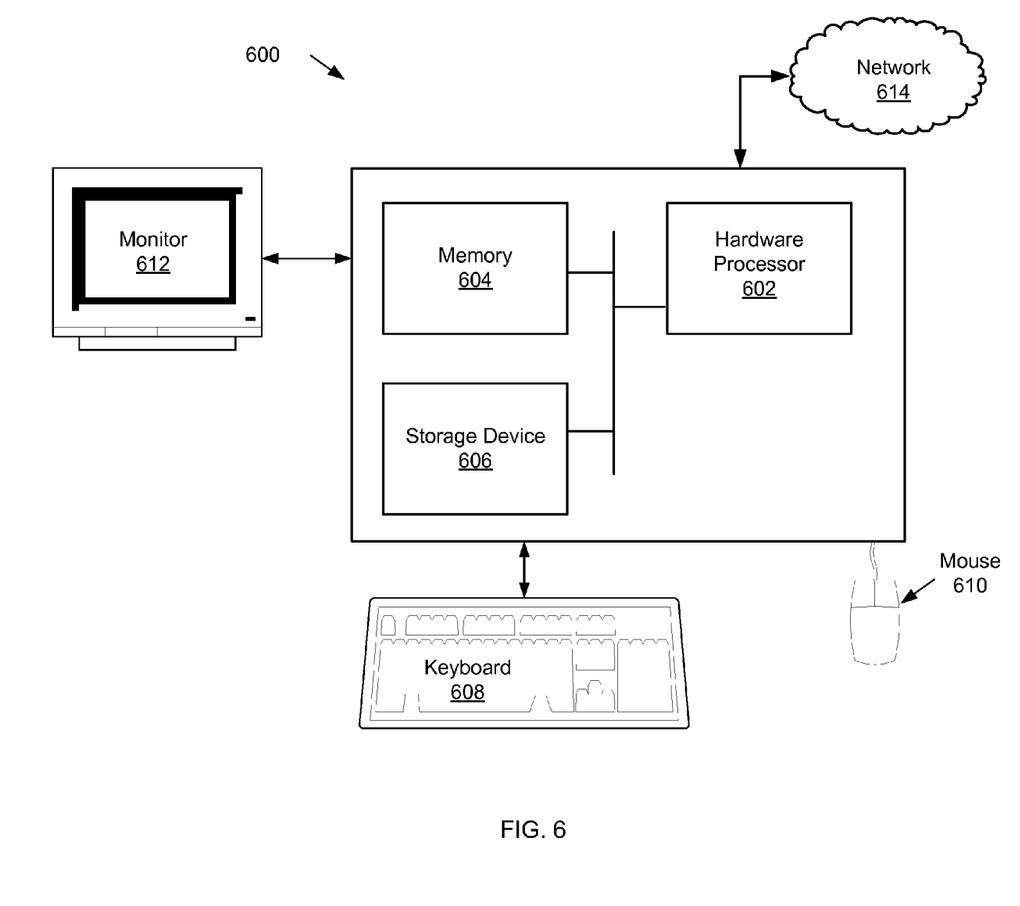
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more hardware processor(s) (602) (such as a central processing unit (CPU), integrated circuit, etc.), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering an electronic document (ED) using a page rendering device (PRD), comprising:
   identifying, within the ED, a text stream and a requested font for the text stream, wherein the text stream comprises a plurality of characters;
   identifying a resident font supported by the PRD as a substitute for the requested font;
   generating a plurality of scaled characters, wherein generating the plurality of scaled characters comprises:
      multiplying a horizontal dimension of a character of the plurality of characters in the resident font with a horizontal scaling ratio relating the requested font and the resident font; and
      multiplying a vertical dimension of the character in the resident font with a vertical scaling ratio relating the requested font and the resident font; and
   rendering, by the PRD, the ED by placing the plurality of scaled characters on a page.

2. The method of claim 1, wherein generating the plurality of scaled characters further comprises:
   scaling an uppercase character of the plurality of characters in the resident font based on an uppercase scaling matrix relating the requested font and the resident font.

3. The method of claim 2, wherein scaling the uppercase character comprises:
   identifying a horizontal dimension and a vertical dimension of the uppercase character in the resident font;
   multiplying the horizontal dimension of the uppercase character with a uppercase horizontal scaling (UHS) ratio; and
   multiplying the vertical dimension of the uppercase character with an uppercase vertical scaling (UVS) ratio,
   wherein the uppercase scaling matrix includes the UHS ratio and the UVS ratio.

4. The method of claim 3, further comprising:
   selecting a reference uppercase character;
   identifying a horizontal dimension of the reference uppercase character in the requested font;
   identifying a horizontal dimension of the reference uppercase character in the resident font; and
   calculating the UHS ratio by dividing the horizontal dimension of the reference uppercase character in the requested font by the horizontal dimension of the reference uppercase character in the resident font.

5. The method of claim 2, wherein identifying the resident font comprises:
   searching a file using the requested font as a search criterion,
   wherein the file identifies the resident font as the substitute for the requested font, and
   wherein the file includes the uppercase scaling matrix.

6. A non-transitory computer readable storage medium storing instructions to render an electronic document (ED) using a page rendering device (PRD), the instructions comprising functionality to:
   identify, within the ED, a text stream and a requested font for the text stream, wherein the text stream comprises a plurality of characters;
   identify a resident font supported by the PRD as a substitute for the requested font;
   generate a plurality of scaled characters by:
      multiplying a horizontal dimension of a character of the plurality of characters in the resident font with a horizontal scaling ratio relating the requested font and the resident font; and
      multiplying a vertical dimension of the character in the resident font with a vertical scaling ratio relating the requested font and the resident font; and render, by the PRD, the ED by placing the plurality of scaled characters on a page.

7. The non-transitory computer readable storage medium of claim 6, the instructions for generating the plurality of characters further comprising functionality to:

scale an uppercase character of the plurality of characters in the resident font based on an uppercase scaling matrix relating the requested font and the resident font.

8. The non-transitory computer readable storage medium of claim 7, wherein the instructions for scaling the uppercase character in the resident font based on the uppercase scaling matrix comprise functionality to:

identify a horizontal dimension and a vertical dimension of the uppercase character in the resident font;

multiply the horizontal dimension of the uppercase character with a uppercase horizontal scaling (UHS) ratio; and multiply the vertical dimension of the uppercase character with an uppercase vertical scaling (UVS) ratio, wherein the uppercase scaling matrix includes the UHS ratio and the UVS ratio.

9. The non-transitory computer readable storage medium of claim 8, the instructions further comprising functionality to:

select a reference uppercase character;

identify a horizontal dimension of the reference uppercase character in the requested font;

identify a horizontal dimension of the reference uppercase character in the resident font; and calculate the UHS ratio by dividing the horizontal dimension of the reference uppercase character in the requested font by the horizontal dimension of the reference uppercase character in the resident font.

10. The non-transitory computer readable storage medium of claim 7, wherein the instructions to identify the resident font comprise functionality to:

search a file using the requested font as a search criterion, wherein the file identifies the resident font as the substitute for the requested font, and wherein the file includes the uppercase scaling matrix.

11. A system for rendering an electronic document (ED) comprising a text stream having a plurality of characters, comprising:

a hardware processor;

a substitute font selector (SFS) configured to identify a resident font as a substitute for a requested font in the ED;

a resident font repository storing the plurality of characters in the resident font; and a layout engine executing on the hardware processor and configured to:

generate a plurality of scaled characters, wherein generating the plurality of scaled characters comprises:

multiplying a horizontal dimension of a character of the plurality of characters in the resident font with a horizontal scaling ratio relating the requested font and the resident font; and multiplying a vertical dimension of the character in the resident font with a vertical scaling ratio relating the requested font and the resident font; and render the ED by placing the plurality of scaled characters on a page.

12. The system of claim 11, wherein the layout engine is located on a printer, and wherein the page corresponds to a physical medium selected from a group consisting of a sheet of paper, a transparency, and a strip of microfilm.

13. The system of claim 11, wherein the substitute font selector includes a lookup table mapping the requested font to the resident font.

14. The system of claim 11, wherein generating the plurality of scaled characters further comprises scaling an uppercase character of the plurality of characters in the resident font based on an uppercase scaling matrix retrieved by the SFS.

15. The system of claim 14, wherein the uppercase scaling matrix comprises an uppercase horizontal scaling (UHS) ratio and an uppercase vertical scaling (UVS) ratio.

16. The system of claim 15, wherein the resident font repository stores a horizontal dimension and a vertical dimension of the uppercase character in the resident font, and wherein scaling the uppercase character comprises multiplying the horizontal dimension of the uppercase character by the UHS ratio and the vertical dimension of the uppercase character by the UVS ratio.

* * * * *